United States Patent [19]

Newsom

[11] Patent Number: 4,554,036
[45] Date of Patent: Nov. 19, 1985

[54] PORTABLE VACUUM DEVICE AND METHOD OF USING SAME

[76] Inventor: Cosby M. Newsom, 15517 S. Seaforth Ave., Norwalk, Calif. 90650

[21] Appl. No.: 607,779

[22] Filed: May 7, 1984

[51] Int. Cl.[4] ............................................. B32B 35/00
[52] U.S. Cl. ..................................... 156/94; 156/285; 156/382; 156/583.3; 264/36
[58] Field of Search .................. 156/94, 98, 285, 382, 156/583.3; 264/36

[56] References Cited

U.S. PATENT DOCUMENTS

| | | | |
|---|---|---|---|
| 4,287,015 | 9/1981 | Danner | 156/382 |
| 4,305,773 | 12/1981 | Hendricks | 156/382 |
| 4,352,707 | 10/1982 | Wengler et al. | 156/94 X |

*Primary Examiner*—Robert A. Dawson
*Attorney, Agent, or Firm*—Cislo, O'Reilly & Thomas

[57] ABSTRACT

A portable vacuum device for carrying out in situ bonding processes wherein the device is capable of encompassing a work site area, creating a vacuum thereabout thereby permitting the patching and repair of the workpiece through a heat and pressure process. Also disclosed is a unique process using the device of invention.

12 Claims, 12 Drawing Figures

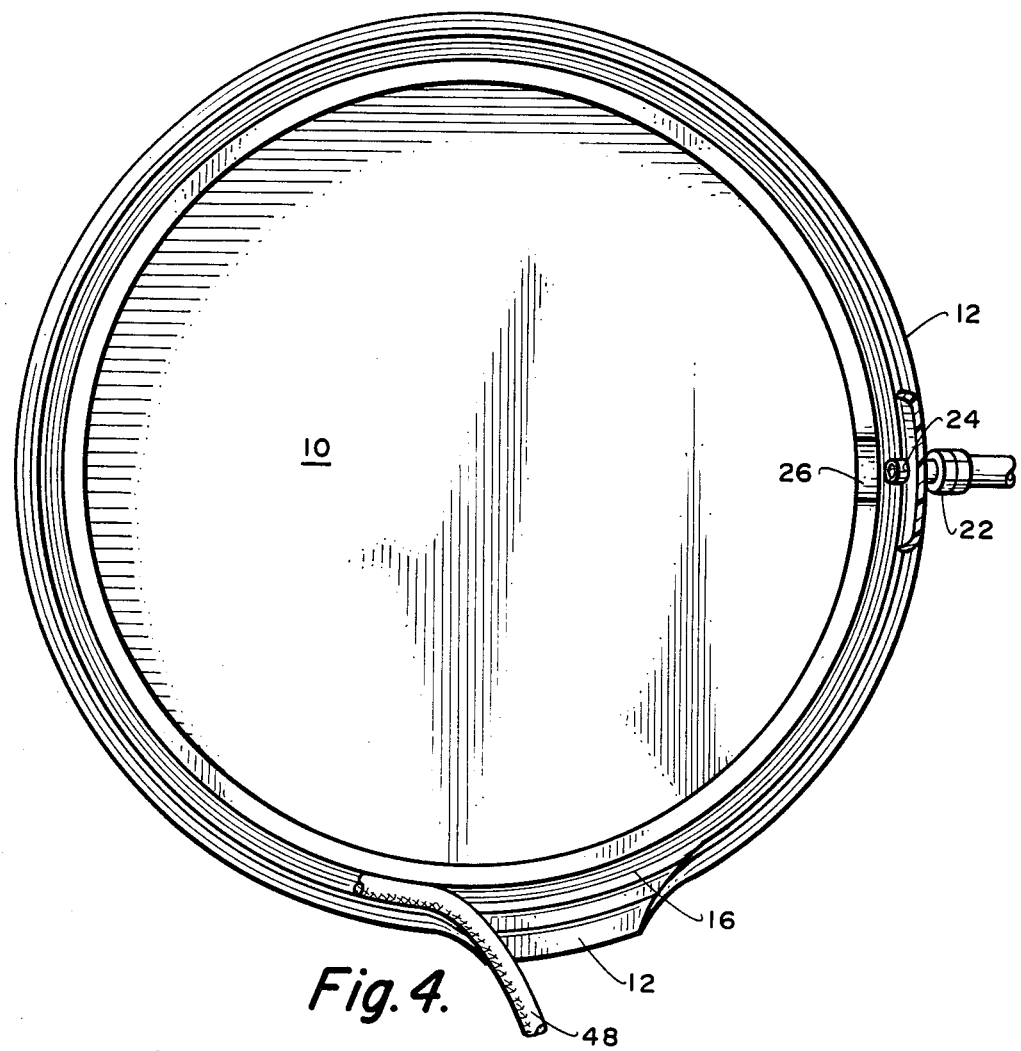
Fig. 4.
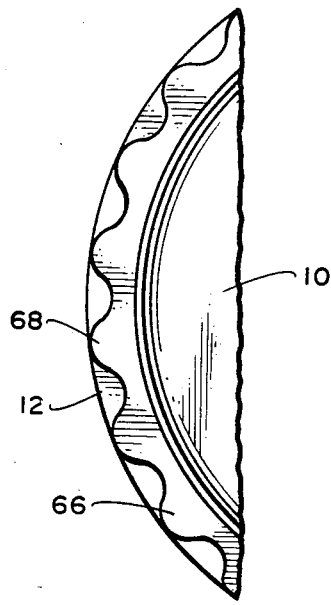
Fig. 6.
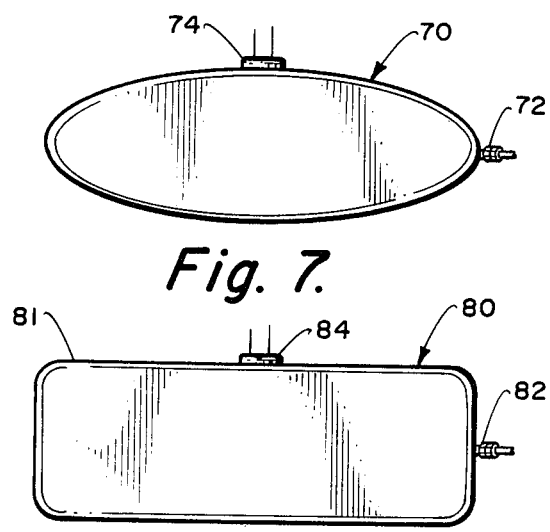
Fig. 7.
Fig. 8.

PORTABLE VACUUM DEVICE AND METHOD OF USING SAME

BRIEF SUMMARY OF THE INVENTION

This invention relates to asportable bonding devices of the type utilized in the repair and mending of composite materials of the type found in high performance aircraft parts and the like.

In the repair of airplane components made of synthetics or laminates with or without metal, such as for example graphite fibers or sheets that are bonded into a unitary monolith by reason of polymers, adhesives and other synthetic materials, it has been necessary to remove sections of the aircraft for repair. That is, where a flaw or fissure has developed in a laminate aircraft component it has been necessary, in order to properly repair same, to remove the component and repair or patch the area of defect in a stationary chamber or structure located some distance from the aircraft that is being repaired.

In view of the labor intensive operation with respect to removing of the laminate section to be repaired and placement of the part in a vacuum chamber whereat pressure and sometimes superambient temperatures are employed so as to effectively permit curing and thus bonding of the repair patch of the remainder of the composite laminate body, such repairs have been time consuming and costly.

With the herein disclosed device and method of effectuating bonding it is possible to perform repair and service operations in situ on the work piece itself without the need for removing the part that needs repair from the remainder of the aircraft or the like structure. That is, should a flaw or fissure develop in a composite laminate structure, the structure would require repair with like bondable material so as to prevent serious destruction and erosion of the composite laminate structure in the area of the flaw or fissure. At the present time, the art requires that this structure be removed from the aircraft, that the fissure or flaw be repaired, bonding material inserted therein and that the structure then be put into a rigid vacuum structure wherein the application of pressure and sometimes heat effectuates curing of the bond material so as to form a permanent bond with the composite laminate. Thereafter the patch is finished and the part is reassembled into the aircraft structure.

With the herein disclosed invention and method of using the same, it is now possible to quickly and effectively perform patching and bonding of flaws, fissures, cracks and the like on the aircraft in situ, without the necessity of removing the part that needs repair. The portable vacuum device is uniquely constructed so that once the crack or fissure is prepared to receive the patching materials, a bonding patching material is placed in the crevice, fissure or flaw, a thermo-blanket placed thereover (if heat is required for curing) and the device of the invention then put in overlying, encompassing relationship to the workpiece at the area at which repairs are to take place. A vacuum is applied so as to evacuate ambient atmosphere from the patching area and thereafter if necessary heat applied by reason of a thermo-blanket for sufficient length of time in order to effectuate proper curing and bonding of the patch material with the remainder of the workpiece being worked upon. Thereafter, the device of the invention is removed and the patched area finished, thereby producing a bonded, or patched part, having the flaw, crack or fissure properly repaired without the need of removing the part from the remainder of the structure with which it is associated.

It is the object of the invention to provide an a portable bonding device for in situ repair and patching of bondable materials.

It is another further object of the invention to provide a bonding device that permits ease of repairing composite laminate materials requiring application of heat and pressure in order to repair the same.

It is still another important further object of the invention to provide a bonding device which is especially adapted for repairing of a composite laminate material wherein the device is used in situ and does not require removal of the part requiring repair from the remainder of its structure.

It is another more important more specific object of the invention to provide a portable bonding device capable of overlying a workpiece at an area that needs repair and wherein a vacuum may be formed in the finite area of said workpiece so that proper repair as by way of composite bonding may take place.

It is still another and even further more specific object of the invention to provide a device and method of repairing composite laminates using heat and pressure without the necessity of the utilization of sophisticated and expensive labor-intensive operations.

It is still another further, even more specific important object of the invention to provide a portable vacuum-forming device which is capable of co-action with a workpiece surface area so as to permit ease of repair of defects within said workpiece area using bondable materials which are cured or otherwise acted upon by heat and/or pressure.

Basically in an exemplary embodiment, the invention relates to a portable bonding device for effectuating in situ repair work and a method therefor wherein a chamber-forming member is adapted to circumscribe an in situ workpiece, upon which a bonding operation or the like is to be performed. The chamberforming member has at least an emcompassing wall to overly said workpiece and has a depending side wall forming an interior chamber and a first seal to exclude ambient atmosphere from said interior chamber. The encompassing and side walls are conformable. An evacuation port communicates the interior chamber to the ambient atmosphere exterior thereof, and is adapted for connection to a vacuum source whereby the interior chamber may be evacuated of ambient atmosphere to form a vacuum therein.

In essence, it is an object of the invention to provide an economically and easy to use portable vacuum device used in thermo and pressure curing of bondable materials in a heretofore unavailable manner.

These and other objects of the invention will become apparent from the hereinafter following commentary and description of the drawings.

BRIEF DESCRIPTION OF THE DRAWWINGS

FIG. 4 is a bottom view of, for example, the device illustrated in FIG. 2 and illustrating one means of forming a vacuum seal with the workpiece;

FIG. 6 is an enlarged fragmented view taken along the line 6—6 of FIG. 5;

FIG. 7 is a plan view of an alternatively configured device of the invention; and FIG. 8 is a plan view of still another alternatively configured device of the invention.

DESCRIPTION OF THE BEST EMBODIMENTS CONTEMPLATED

Figure 1:
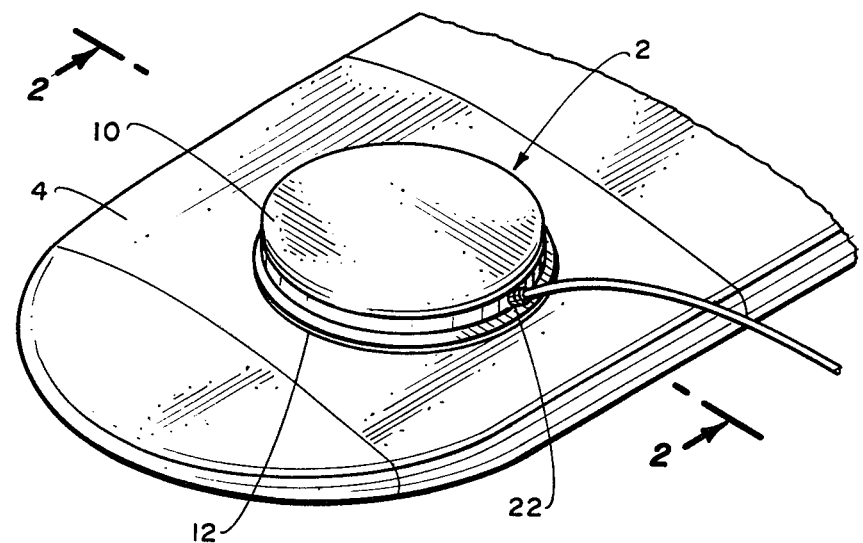
FIG. 1 is a perspective view illustrating the utilization of the inventive device on a workpiece such as an aircraft stabilizer section.
Figure 2:
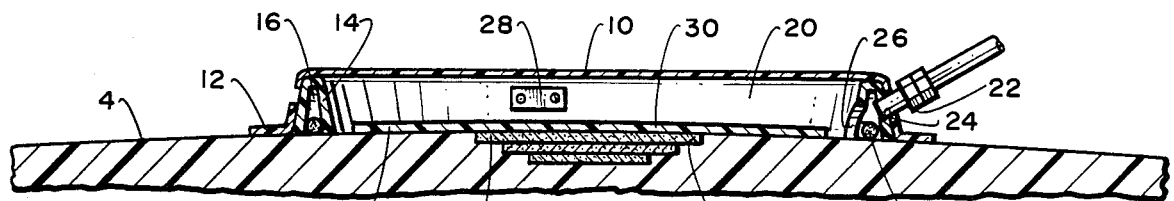
FIG. 2 is a view taken along the line 2—2 of FIG. 1.
Figure 3:
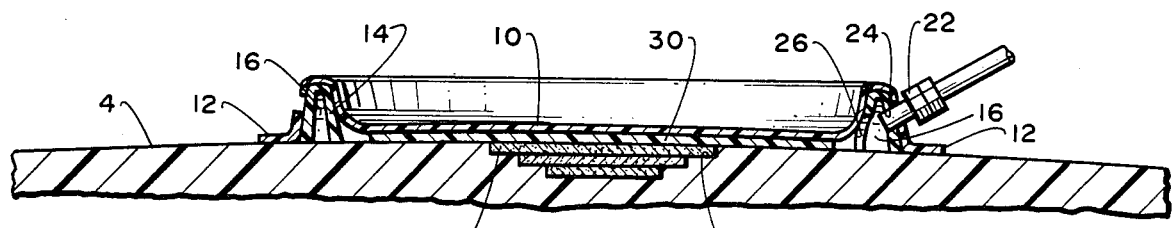
FIG. 3 is a view similar to FIG. 2 but illustrating the device and operation thereof during the vacuum phase.

Referring to the drawings wherein like numerals of reference designate like elements throughout, it will be seen that the device 2 is illustrated as being positioned on the stabilizer portion 4 of an aircraft wherein the stabilizer 4 is made of a composite laminate of graphite materials, for example. The composite laminates are well-known in the art and it is also well-known that small cracks or fissures such as 8, must be repaired upon discovery since to not do so would be to seriously risk greater destruction because of the supersonic speeds and temperatures and pressures to which these structures are subjected.

The device of the invention 2 in this instance, has a multiple component construction wherein at least an encompassing top wall 10, is secured to a side wall 12, through annular interior wall member 14, having a groove 16 thereabout.

The at least top wall 10 and the depending side wall 12 in this instance, continuous about the periphery of the member 2, are of conformable material of sufficient flexibility and impermeability as well as resistance, so as to be able to endure the temperatures and pressures of a bonding process as will be described hereinafter.

The inner set interior wall 14, having the groove 16 thereabout, is of relatively greater rigidity than the materials of construction making up the walls 10 and 12. The height of the inner wall member 14 is such that a sufficient volumetric capacity is formed so as to encompass the workpiece, for example 4, in the area of the repair site adjacent the fissure 8.

Thus, various size devices 2 my be fabricated using the principles of the invention, just so long as the device is capable of overlying the workpiece and forming an interior chamber 20 to accomodate the bonding operation as will become apparent.

The device 2 is provided with a vacuum source connector 22, communicating through the aperture 24 in fluid tight relationship to the recess or groove 16, formed by inner set wall 14. The chamber 20 is also in communication to the groove or recess 16 by reason of a port 26, communicating thereto, which in turn communicates to the port 24 and vents to the vacuum connector 22. The inner set wall member 14 of an inverted v-like configuration is also provided with a fluid tight electrical connector member 28, whereby a thermo-blanket 30 may be connected to an electrical energy source for use in the bonding operation if found to be necessary.

While the device 2 has been described as comprising the top wall 10 of a conformable material secured to the less conformable inner wall member 14, having the exterior side wall 12 connected thereto, it should be understood that an integral construction may be used as opposed to a construction that would require vulcanization or other securement of the members 10, 14 and 12 thereof.

In selection of the conformable materials making up the walls 10 and 12, it is necessary to have conformable elastomeric type materials having flexibility and impermeability as well as elongation and tear-resistant characteristics, keeping in mind the intended end-use of the device. Obviously, the materials of construction must be temperature resistant to withstand ambient to 400° F. and higher, and while the components making up the device 2 may be simply bonded or vulcanized into various shapes, it should be understood that other means of fabrication and other materials of construction may be found to be useful. It is only important that the device 2 be capable of encompassing, circumscribing, and overlying a workpiece area and that the side wall portion 12 be capable of forming a first vacuum seal with the surface of the workpiece and that the inner set wall member 14 be capable of forming an additional seal with the workpiece whereby the chamber 12 may be evacuated for accomplishing the repair and bonding process to which the invention relates.

Having described the major components of the one embodiment of the device 2, a brief description of its mode of operation will be described prior to describing the other altenative embodiments of the device.

Assuming that a fissure 8 is found in the workpiece of stabilizer 4, the fissure 8 is prepared and otherwise treated so as to receive a bonding repair patch 40 and thereafter a thermo-blanket, such as 42, is positioned over the workpiece in the area of the fissure 8 containing the bonding material 40 and hooked into the electrical connector 28 which, as previously disclosed, is a fluid-tight relationship with the interior chamber 20 formed by the device 2.

Figure 3A:
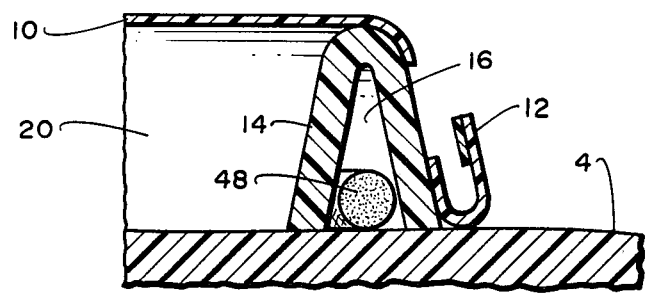
FIGS. 3a, 3b, 3c and 3d are enlarged fragmentary views of the seal area of the device illustrated in FIGS. 1-3 depicting each stage during use of the device of the invention.
Figure 3B:
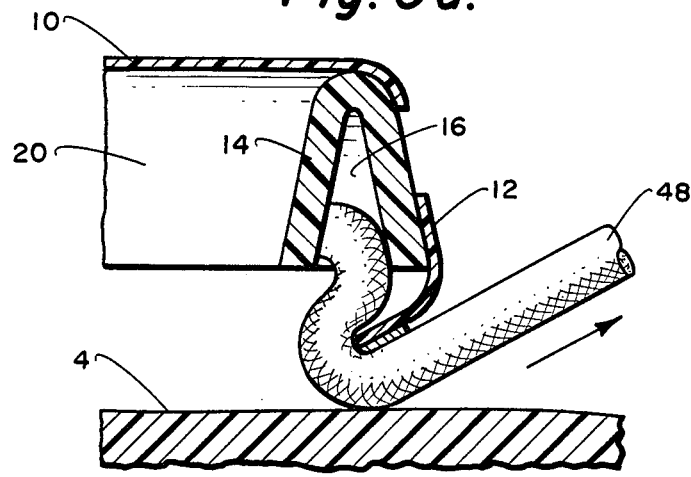
Figure 3C:
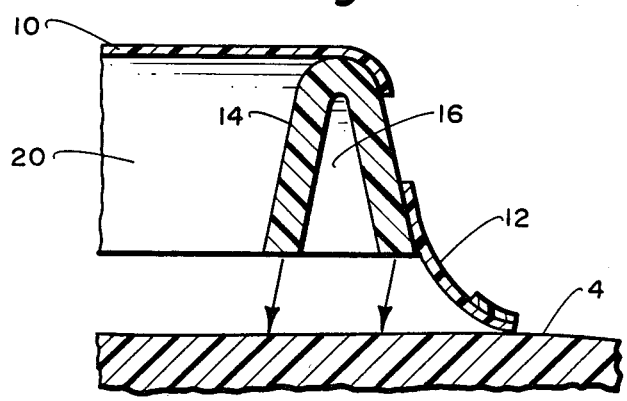
Figure 3D:
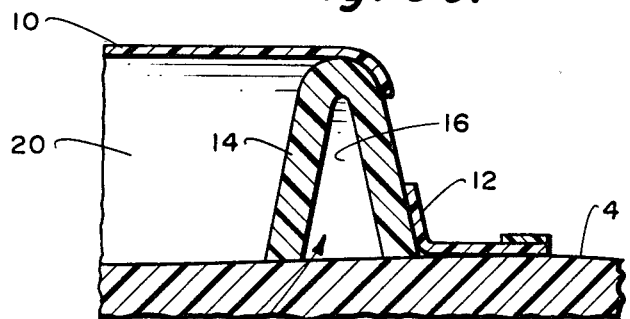

Referring to FIGS. 1, 2, 3, and 3a–d inclusive, it will be seen that the device 2 has been positioned over the workpiece 4, the bondable patch material 40 placed in the fissure 8 and the thermo-blanket 42 placed thereover, and connected to the electrical connector 28, a permeable length of cord or rope 48 is positioned in groove on recess 16. The vacuum connector 22 is then connected to a vacuum source to completely evacuate the chamber 20, thereby collapsing the wall 10 onto the workpiece 4 and thermo-blanket 42. At the time that the vacuum process is initiated (FIG. 3a), the first seal that occurs is by reason of the conformable depending side wall 12 coming in contact with the upper surface of the workpiece 4 (FIG. 3b), and in order to facilitate that the proper seal is formed, the cord or line 48 placed within the groove 16 of inner set wall 14 (FIG. 4), 15 pulled by hand or otherwise in controlled fashion, so that the cord 48 will position the wall 12 from its normal depending conforming posture into a lateral configuration (FIG. 3c) so as to form a first seal with the upper surface of the workpiece 4. As the evacuation process continues, pressure build-up caused by atmospheric pressure acting upon the device 2, and more specifically the inner set wall 14, of less conformability than the walls 10 and 12, will cause secondary seals to occur as at 50, between the under edge of the wall 14 and the upper surface of the workpiece 4 (FIG. 3d). As the wall 10 collapses, it superposes and then comes in contact with the thermo-blanket 42 and after insuring that there are no leaks, the thermo-blanket 42 is activated and sufficiently high temperature is applied for a sufficient length of time in order to polymerize, bond or otherwise cure, the material 40 in the fissure 8.

After a sufficient length of time has passed wherein the curing process takes place under atmospheric pressure and superambient temperatures, the vacuum source is disconnected, whereupon the device 2 is removed from the workpiece 4 and the patch finished so as to provide a smooth and even finish for the patched surface area with the remainder of the workpiece 4.

Figure 5:
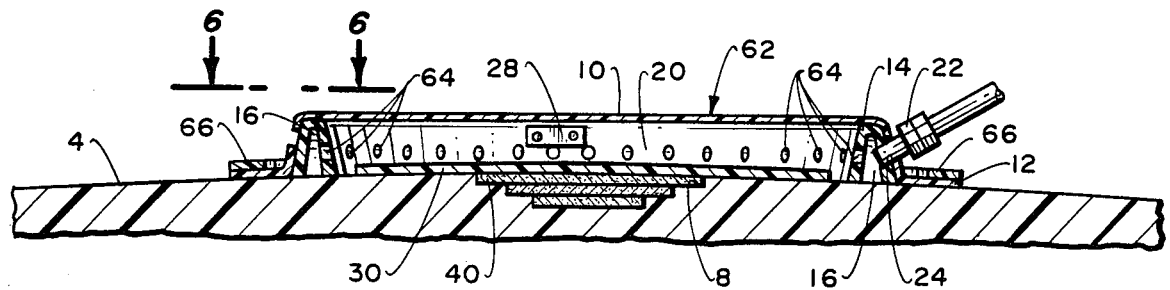
FIG. 5 is a view similar to FIG. 2 but illustrating an alternative embodiment of the invention.

Referring now to FIG. 5, an alternative device 62 is illustrated wherein it is identical to that previously described for device 2 with the exception that, instead of having a singular port 26 communicating the recess or groove 16 to the interior of the chamber 20, a plurality of ports or apertures 64 are provided through the interior wall 14 which in turn communicates to the recess or groove 16, by reason of which a vacuum may be pulled from the interior of the chamber formed by device 62 in a more even fashion so as to accomplish the exact same results as is accomplished by the device 2 previously described.

The other distinction in addition to the vacuum ports 64, relative to the device 2 previously described, is the provision of a lip portion 66 (FIGS. 5 and 6), secured to the exterior surface of the wall 12, which may be of the same construction of the wall 12 or upper wall 10 and has a scalloped edge configuration 68 and extends about the periphery of the wall 12 and adds rigidity or stiffening thereto so that the wall 12 may be easily upturned in order to facilitate the formation of the primary or initial seal during the evacuation of the chamber 20.

The various configurations that the devices 2 and 62 of the invention may take, are best seen in FIGS. 7 and 8 where an oval and rectangular configuration, having rounded edges, may be utilized. Thus in FIG. 7, we see an oval configured device 70, having the vacuum port connection 72 and the electrical connectors 74 by which the thermo-blanket, for example, may be energized. Likewise, in FIG. 8, the device 80 of rectangular configuration with rounded corners 81 has vacuum connector 82 and thermo-blanket connector 84.

The materials of construction for the top or upper wall 10 and the side wall 12 and the lip portion 66, may be the silicon elastomer having an ASTM designation, FC, FE, HK wherein the durometer range may be from 10–90 but preferably such that conformability is still maintained in order to achieve the end results desired as those of ordinary skill in the art will appreciate.

Other elastomers include the fluoroelastomers including the fluorosilicones, ASTM designation FK, the fluorocarbon elastomers, ASTM designation HK, neoprene, ASTM designation BC, BE, having durometer in the 10–100 hardness range, "HYPALON", a DuPont trademark for its chlorosulfonated polyethylene, having the ASTM designation CE, the nitriles, having an ASTM designation BF, BG, BK and CH in the 30–100 durometer hardness range, polyacrylics having an ASTM designation DF, DH, also in the 40–100 durometer hardness range, styrene-butadiene having the ASTM designation AA, BA, in the 40–100 durometer hardness range, ethylene propylene having an ASTM designation BA, CA, with a 30–100 durometer hardness range, butyl having an ASTM designation AA, BA in a 30–100 durometer hardness range and natural rubber having the ASTM designation AA in either 20–100 durometer hardness range.

Likewise the inner set wall member 14 may be of any of the foregoing materials, it only being important that it have a durometer hardness range greater than the conformable walls 10, 12 and 66, making up the devices of the invention. In each instance, the elastomers making up the components may be fabric reinforced as those of ordinary skill in the art will recognize.

Thus, there has been disclosed a uniquely designed device and a method for use thereof which enables one to repair composite laminate materials in situ economically and skillfully and those of ordinary skill in the art will at once recognize that various changes, modifications and alterations may be made to the various devices as disclosed herein, but all such changes, modifications, and alterations will not depart from the essence and spirit of the invention and all such changes, alterations and modifications are intended to be covered by the appended claims.

I claim:

1. A portable bonding device comprising the combination of:
a chamber forming member adapted to circumscribe in situ workpiece upon which a bonding operation or the like is to be performed, said chamber forming member having at least an encompassing top wall to overlie said workpiece and having a depending side wall forming an interior chamber and a first seal to exclude ambient atmosphere from said interior chamber, said encompassing and side wall being conformable and further having an operatively associated inner set interior wall adapted to form a secondary seal to exclude atmosphere from said interior chamber; and an evacuation port communicating said interior chamber to the ambient atmosphere and being adapted for connection to a vacuum source whereby said interior chamber may be evacuated of ambient atmosphere to form a vacuum therein.

2. The device in accordance with claim 1 wherein said side wall and said inner set interior wall are congruent in configuration and are of sufficient size to be able to form an interior chamber of sufficient volumetric capacity so as to accomodate the said in situ workpiece and said depending side wall is continuous.

3. The device in accordance with claim 2 wherein said side wall and said inner set interior wall are of relatively different conformability wherein said inner set interior wall is relatively rigid in comparison to said side wall.

4. The device in accordance with claim 3 wherein an evacuation port extends through said side wall and said inner set interior wall communicating the exterior of said side wall to the interior of said chamber.

5. The device in accordance with claim 3 wherein said inner set interior wall forms a recess groove in cooperation with said side wall and wherein said side wall has an exit port communicating to the exterior thereof and wherein there are a plurality of exit ports in said inner set interior wall communicating said recess groove and said interior chamber.

6. The device in accordance with claim 5 wherein a lip member is disposed on the edge portion of said side wall about the periphery thereof.

7. The device in accordance with claim 6 wherein said lip member has a scalloped edge and is of sufficient rigidity to facilitate the formation of said first seal formed by said side wall.

8. The device in accordance with claim 7 which includes a wire connector extending from the exterior of said device to the interior of said interior chamber in fluid-tight relationship therewith and being adapted to accomodate electrical energy connection thereto and said inner set interior wall has a dual sealing edge.

9. The device in accordance with claim 8 wherein said device is circular in configuration and wherein said at least encompassing wall and said side wall are of like conformable, elastomer-type material capable of withstanding at least atmosphereic pressure and temperature substantially greater than ambient and at least greater than the material to be bonded during said bonding operation.

10. The device in accordance with claim 9 wherein said inner set interior wall is formed of flexible and conformable material of different rigidity than said depending side wall and wherein when said device is connected to a vacuum source said inner set interior wall is sufficiently deformed to form a secondary seal with said workpiece.

11. The method of repairing a bondable workpiece in situ which comprises the steps of:
 a. preparing the workpiece area having the flaw or fissure therein;
 b. applying a bondable material patch to said flaw of fissure in sufficient amount to reconstruct the same, said bonding material being curable at or above ambient temperatures;
 c. placing a portable vacuum bonding device over said flaw or fissure having bonding material therein and evacuating the ambient atmosphere in the area of said flaw or fissure and causing atmosphereic pressure to act upon the bonding material in said flaw or fissure; and
 d. effectuating curing and setting of said bonding material and thereafter removing said device and finishing the workpiece surface in the area of said previous flaw or fissure.

12. The method in accordance with claim 11 which includes the step of placing a thermo-blanket over said flow or fissure area having the bonding material therein; where said bonding material is heat curable and applying heat via said thermo-blanket.

* * * * *